Sept. 6, 1955  J. CARTON  2,717,151
MEANS FOR MEASUREMENT
Filed Jan. 10, 1950  3 Sheets-Sheet 1
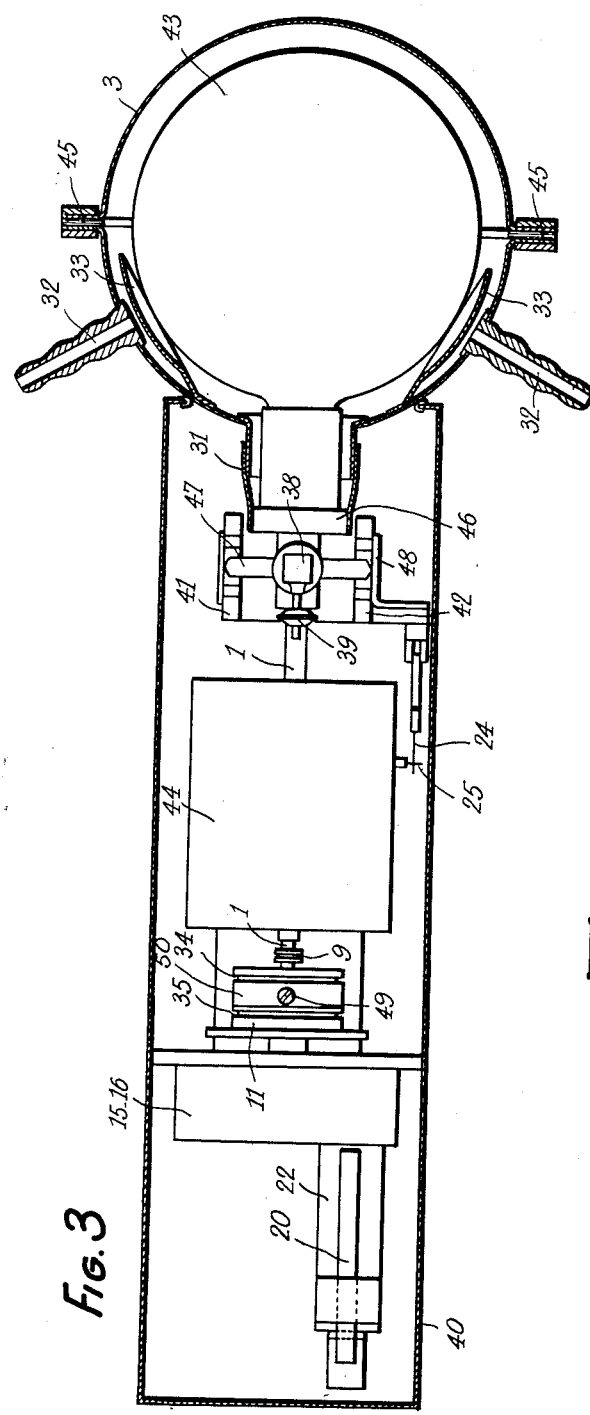
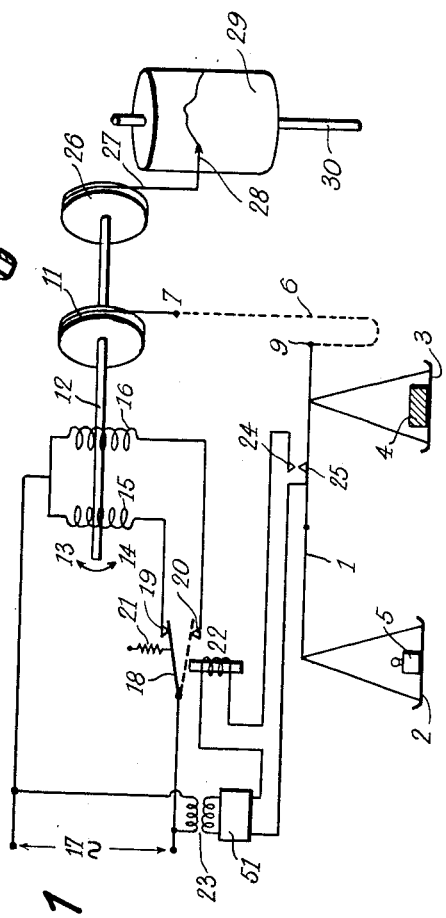
INVENTOR
JEAN CARTON
BY Frederick E. Hane
ATTORNEY Sept. 6, 1955    J. CARTON    2,717,151
MEANS FOR MEASUREMENT
Filed Jan. 10, 1950    3 Sheets-Sheet 2

INVENTOR
JEAN CARTON
BY
ATTORNEY

Sept. 6, 1955      J. CARTON      2,717,151
MEANS FOR MEASUREMENT
Filed Jan. 10, 1950      3 Sheets-Sheet 3

INVENTOR
JEAN CARTON
BY
ATTORNEY

United States Patent Office 2,717,151
Patented Sept. 6, 1955

2,717,151

MEANS FOR MEASUREMENT

Jean Carton, Paris, France

Application January 10, 1950, Serial No. 137,877

Claims priority, application France January 18, 1949

8 Claims. (Cl. 265—7)

A large number of measuring devices are based on the establishment of a static equilibrium of forces among which frictional forces play a part, so that the movable member of the device when it comes to a stop for a predetermined value of the magnitude to be measured, does not always become actually stationary accurately at the same point, but at a random point within a certain range or area defined between two limits which are more or less close to each other depending on the sensitivity of the apparatus, and which may be termed as "area of sensitivity"; the position of said point within this area is then taken as indicating the result of the measurement.

The greater the care with which the apparatus is constructed, and the lower will the forces of friction be, the longer also will the time taken by the device to come to a stationary condition at the point indicating the result of the measurement. It may then be said that the more sensitive the apparatus, the longer it takes to effect a given measurement.

Where on the other hand the frictional forces are high, be it due to faulty construction or as a result of the use of a specially provided braking means, static equilibrium is more quickly reached, but precision of the measurement is impaired because of the uncertainty in the action of such friction forces, such action being apt to vary from any instant to the next in an unpredictable manner. The frictional forces moreover reduce the sensitivity of the apparatus. It is known in another respect that in order to improve the sensitivity of the apparatus independently of certain mechanical structural requirements, it may be desirable to introduce slight percussion or shock effects which act to bring the actual equilibrium position closer to the ideal point of equilibrium within the area of sensitivity; such shocks however usually are irregular and non-uniform in strength and furthermore they introduce a certain degree of uncertainty as to the validity of the result of the measurement, that is to say the accuracy thereof. In other words, the sensitivity would be increased, but only at the expense of accuracy.

The present invention has for its object to provide means whereby the accuracy of a measurement is preserved and even increased, while at the same time the sensitivity of the measuring apparatus is also increased.

The invention firstly comprises a method of measuring or indicating a magnitude of any character which consists in causing a servo-motor to act continually alternately in one direction or the other upon a senser device responsive to the position occupied by the movable member of the measuring or indicating instrument, said senser device being in turn adapted to produce the reversals of operation of the servo-motor upon said device passing beyond a predetermined indicating or marking position in either direction.

More specifically the invention comprises a measuring or indicating method which consists in setting up a dynamic equilibrium, the movable member of the measuring or indicating instrument being continually constrained to oscillate about its static equilibrium position, such oscillations being sustained by means of an auxiliary source of energy adapted at all times to compensate for the energy absorbed by the forces of friction. In this more specific aspect of the method, the senser device is so constructed as to apply a slight force to the measuring or indicating member in order to cause it to oscillate about its true equilibrium position. The average value intermediate the range of oscillation of the movable member will accordingly continually indicate the accurate results of the measurement. Thus the equilibrium position is defined with accuracy regardless of external conditions and in particular regardless of the forces of friction.

The invention further provides apparatus for carrying the above-defined method into practice, said apparatus comprising in addition to the measuring or indicating instrument proper, a source of energy constituted by a servo-mechanism continually moved in alternating opposite directions and controlled through a common relay system, which, depending on its occupying either one or the other of two positions, is adapted to set the servo-mechanism into movement in said one or said other direction, said relay system being controlled through the medium of an element connected with the movable member of the instrument.

In one embodiment of the invention, the indicating or measuring instrument comprises an oscillable movable member the oscillations of which about and ideal position of balance are sustained by the said servo-mechanism, while the relay is an electric relay energization and de-energization of which are adapted to set the servo-mechanism into operation in respective opposite directions, said relay being inserted in a circuit including a pair of contacts one of which is secured to the movable member of the measuring or indicating instrument.

Thus the servo-mechanism is continually operative to drive the movable member of the measuring or indicating instrument alternately in one and the other direction from its position of static balance. As the servo-mechanism drives the movable member in one direction, said member acts on the control through said relay means so that the servo-mechanism will then be caused to drive said movable member in the opposite direction, thus at all times to enclose or bracket the true value of the measurement.

The method of the invention and the advantages secured by it will be more readily understood upon perusal of the ensuing description of one embodiment thereof as applied to an improved gas balance according to the invention, with reference to the accompanying diagrammatic drawings in which:

Fig. 1 diagrammatically illustrates a balance provided with improved means according to the invention;

Figs. 2 and 2a taken in conjunction show in vertical section a balance for following the variations in specific gravity of a gas, equipped with means according to the invention;

Fig. 3 is a section on line III—III of Fig. 2;

Figure 2:
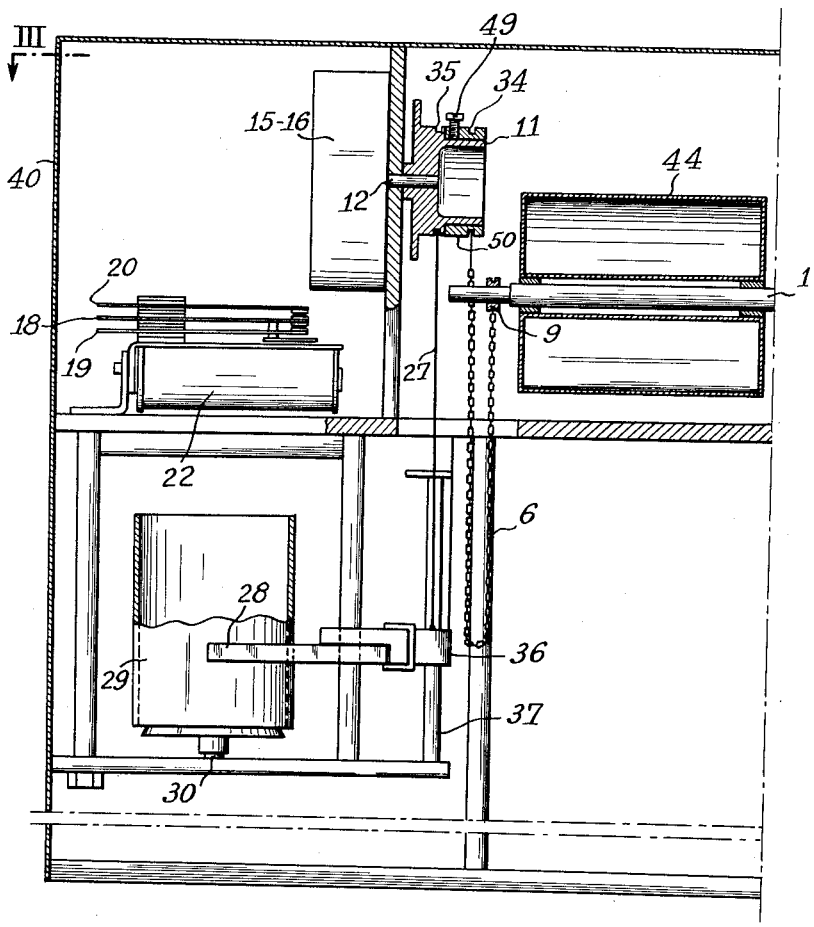
Figure 2A:
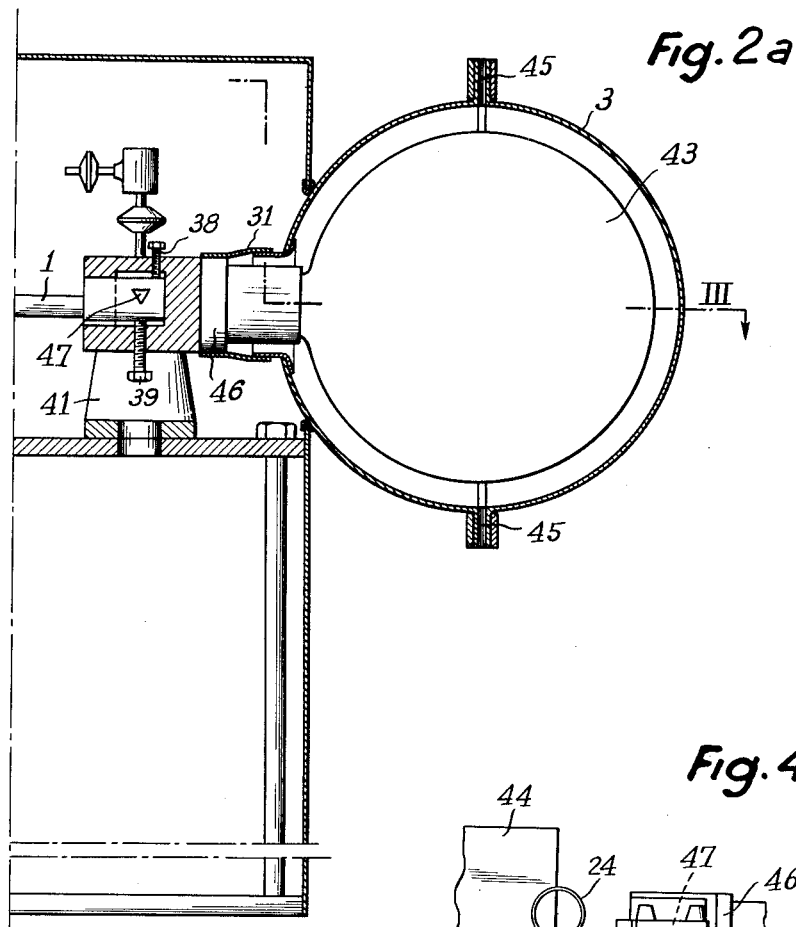

A diagrammatic sketch of a balance wherein the method of the invention is embodied, is given in Fig. 1 for explanatory purposes merely. The measuring instrument diagrammatically shown therein is a balance having a balance-beam 1 and two trays 2 and 3. On the tray 2 weights shown at 5 are placed to balance the weight of a body 4. According to known practice, the balance beam 1 carries a small chain or the like 6 attached as at 9 to the end of the balance beam and the effective length of which is adjustable at will. According to the invention, the chain 6 is attached at its free end 7 to a string which is wound about a drum 11 mounted on a shaft 12 adapted to be driven in either direction as indicated by double-headed arrow 13—14 by a respective one of two motors 15, 16 with oppositely-wound coils. The motors are fed from a source 17 of a—c through a switch 18 adapted to put one or the other of the motors into operation depending on whether the switch is in position 19 or 20. The switch is maintained in position 19 when in idle condition by a spring 21 and is adapted to be actuated to its position 20 when attracted by an electromagnet 22 upon the magnet being energized with current. This current is supplied from the same source of a—c 17 through a transformer 23 and a rectifier 51 upon closure of a set of contacts 24—25. The contact 24 is fixed and the contact 25 is movable with the balance-beam 1. The shaft 12 also carries a drum 26 over which a string 27 is wound the string 27 being connected to a stylus 28 movable over the surface of a cylinder 29 rotatable about a pivot 30.

In operation, if the weight 4 is lighter than the weight 5, the balance-beam 1 will be lowered on the side of weight 5 and, on closure of switch 24—25 the magnet 22 will be energized, attracting the arm of switch 18 to position 20. The motor 16 is then energized and rotates the shaft 12 in the direction 13, together with drum 11, so that an additional weight of the chain member 6 is inserted in the system. This after a short time will cause the balance-beam 1 to swing over and break the contact at 24—25. The magnet 22 is deenergized and the arm 18 under the action of its bias spring 21 is restored to position 19, whereby the motor 15 becomes energized, rotating the shaft 12 in the direction 14 together with the drum 11, so that the effective length of the chain 6 will be reduced and the reverse process will occur, and so on.

The movements of the shaft 12 corresponding to the oscillations of the balance-beam 1 are transmitted through the medium of the drum 26 and string 27 to the stylus 28 and are thus caused to be recorded upon the cylinder 29.

According to the invention, the balance beam 1 is constantly subjected to the urge of the external action at all times applied to it in one or the other direction. As a result of this feature, and owing to the provision of the above-described means, a greatly increased sensitivity of the balance is secured. The wavy curve which is inscribed upon the recording cylinder 29 practically represents a very fine sine curve in which the amplitude and cycle characteristics are of course functions of the inertia of the electric system and the fineness of the contact at 24—25.

Figure 4:
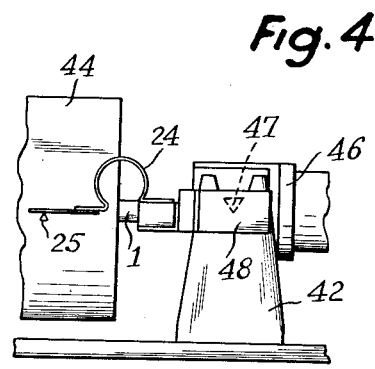
Fig. 4 is a side elevation of a detail of the gas-balance shown in Figs. 2 and 3.

In this way degrees of sensitivity in the range of ten times the usual sensitivity of the corresponding balance are very easily obtained. Since furthermore a balance in itself provides a highly accurate measuring instrument, the resulting device may be put to a number of highly interesting practical uses, such as the provision of a densimetric balance for gases, as shown in Figs. 2, 3 and 4.

In these figures, a precision balance is shown designed for determining and recording the variations in specific gravity of a gas, equipped with the means described above.

The balance comprises a balance beam 1 oscillable about a knife-edge 47 and supporting at one of its ends a gas-tight capacity 3 containing a sealed bulb 43. On the other side of the balance-beam 1 there is a capacity 44 so predetermined as to eliminate the influences of temperature- and pressure-variations. The capacity 3 is herein made up of two semi-spherical shells interconnected with a gas-tight seal 45; the capacity is closed by a plug 46 surrounded by a flexible seal 31. Gas is introduced into the capacity 3 around the bulb 43 through suitable inlet connections such as 32 in front of which deflector baffles such as 33 are disposed. The capacity 44 has secured to it a gold contact 25 upon which a platinum thread or wire 24 is adapted to bear, the platinum thread or wire 24 being secured to a support 42 of the balance-beam 1 through the medium of a bracket 48 and connected through circuit connections not shown with an electric relay system 18, 19, 20 controlled by an electromagnet 22 and actuating through circuit connections not shown a motor 15, 16 adapted to rotate a shaft 12 in one or the other direction. Upon the shaft 12 there is mounted a drum 11 carrying a peripheral member 50 retained by a screw 49 and having formed in it an annular groove 34 in and around which a string 7 is adapted to be wound. The string 7 is extended by a small chain 6 the opposite end of which is secured at 9 to the balance-beam 1. In an annular groove 35 of the same drum 11, the diameter of the groove 35 being not in every case the same as the one of the groove 34, another string 27 is adapted to be wound, the end of the string 27 supporting a weight 36 slidable on a rod 37. A stylus 28 is secured to the weight 36 and rests on a drum 29 rotatable about a shaft 30.

The entire apparatus is enclosed within a casing 40, the knife-edge 47 resting on two supports 41 and 42 and the balance-beam 1 being provided above the knife-edge 47 with a set of adjusting screws 38 and 39.

After the balance has been set, by adjustment of the setscrews 38 and 39, at the balance-position corresponding to the initial specfic gravity of the gas to be tested, the contact 25 and the wire 24 are in contact at this position. Under such conditions, the relay 18 is in the position 20, thus causing the motors 15, 16 to rotate in the direction causing the chain 6 to be lowered; consequently the equilibrium is destroyed and the contact between contact 25 and wire 24 is broken. The breaking of this contact operates the relay which assumes its position 19, thereby reversing the direction of rotation of the motor and of the shaft 12, and raising the chain 6 up to a point where the contact 25 and wire 24 again are in contact with each other and so on.

So long as the specific gravity of the gas in which the bulb 43 is immersed remains constant, such movements will succeed one another at a constant rate the duration of each cycle being in the order of a few seconds, and the record curve transmitted through the string 27, weight 36 and stylus 28 engaging the cylinder 29 is a sine curve of very small amplitude, so as to be practically assimilable to a horizontal line. When however the density of the gas is varied, the displacement of the chain assumes a greater value and the curve inscribed by the stylus will follow the effective variations of the specific gravity of the gas tested.

It is to be understood that while the method of the invention has herein been described in its application to a balance, its scope is not restricted thereto and that the invention may be applied to any suitable type of measuring or indicating instrument without exceeding the purview of the ensuing claims. It is also to be understood that the expression "senser device" or "senser means" is used herein and in the claims to designate not only electromechanical devices such as that shown for purposes of exemplification at 24—25 in the drawings and described in connection therewith, but further any means adapted to sense the position of the movable member of the instrument, regardless of its manner of operation (whether electro-mechanical, photo-electrical, or purely electrical or electronical).

What I claim is:

1. A measuring device for measuring a physical magnitude by comparison with a reference physical magnitude, the said device comprising a movable member arranged to hunt about and pass through a position of equilibrium indicative of a condition of balance between the two magnitudes, reversible movable means operatively connected with the movable member and arranged to exert a moving force upon the movable member for moving the same in one or the other direction relative to said position of equilibrium, and control means including contact means controlled by the position of the movable member and controlling the direction of movement of said reversible means, the said contact means being actuated for reversal of the reversible means by the movable member moving into a position of unbalance on one or the other side of said position of equilibrium, the said reversible means being arranged to be continually moving during a measuring operation thereby causing the movable member continually to swing through a range including said position of equilibrium, the median position of the movable member being indicative of a value of the magnitude to be measured.

2. A measuring device for measuring a physical magnitude by comparison with a reference physical magnitude, the said device comprising a movable member arranged to hunt about and pass through a position of equilibrium indicative of a condition of balance between the said two magnitudes, weight means variable in effective weight operatively connected with the movable member for causing movement of the member into a position on one side or the other of said position of equilibrium by an increase or decrease of the effective weight of the weight means, electrically controllable reversible drive means operatively connected with the weight means, movement of the drive means in one direction increasing the said effective weight and movement of the drive means in the opposite direction decreasing the said effective weight, circuit means connecting said drive means in an energizing circuit for continuous operation of the drive means during a measuring operation, and switch means connected with said energizing circuit and arranged to occupy either a position causing movement of the drive means in one direction or a position causing movement of the drive means in the opposite direction, the position of the said switch means being controlled by the movements of the movable member relative to the said position of equilibrium in either direction, thereby causing the movable member continually to swing through a range including said position of equilibrium, the median position of the movable member being indicative of a value of the magnitude to be measured.

3. A measuring device for measuring a physical magnitude by comparison with a reference physical magnitude, the said device comprising a balance beam arranged to hunt about and pass through a position of equilibrium representative of a condition of balance between the two magnitudes, weight means variable in effective weight operatively connected with the balance beam for causing movement of the said beam into a position on one side or the other of said position of equilibrium by an increase or decrease of the effective weight of said weight means, electrically controllable reversible drive means operatively connected with the weight means, movement of the drive means in one direction increasing the said effective weight and movement of the drive means in the opposite direction decreasing the said effective weight, circuit means connecting said drive means in an energizing circuit for continuous operation of the drive means during a measuring operation, electromagnetic switch means including switch contacts connected with said energizing circuit, the said switch contacts closing the energizing circuit for movement of the drive means in one direction upon energization of the electromagnetic means and closing the energizing circuit for movement of the drive means in opposite direction upon de-energization of the electromagnetic switch means, and control switch means connected in circuit with the electromagnet means for controlling the energization thereof, the said control switch means including for the purpose aforesaid a stationary contact means and a contact means movable in unison with said balance beam, engagement of the said contact means actuating the drive means for movement in one direction and disengagement for movement in opposite direction, thereby causing the balance beam continually to swing within a range including said position of equilibrium, the median position of the balance beam being indicative of a value of the magnitude to be measured.

4. A measuring device according to claim 2, in combination with recording means operatively coupled with the drive means and controlled by the movements thereof, the said recording means being arranged to record in form of a graph the movements of the drive means in either direction.

5. A measuring device according to claim 4, wherein the said recording means comprise a movable stylus and a surface adapted for recording thereon by the stylus, and means operatively coupling the stylus with the drive means for moving the stylus in synchronism with the drive means relative to and over said recording surface.

6. A measuring device according to claim 5, wherein the said coupling means comprise winding means mounted for movement in unison with said drive means, and string means partly wound upon said winding means and attached to said movable stylus for moving the latter corresponding to the winding and unwinding of the string means by said winding means.

7. A measuring device according to claim 6, wherein the said winding means comprise a drum including a circumferential groove and mounted for rotation in either rotational direction by said reversible drive means, and wherein said string means for moving the stylus are wound and unwound by a rotation of said drum.

8. A measuring device according to claim 7, wherein the said drum is formed with a second circumferential groove, and wherein the said weight means comprise cable means partly wound about said second groove and secured to said movable member, rotation of said drum in one or the other rotational direction increasing and decreasing respectively the effective weight of said weight means, thereby causing a continual reciprocatory movement of the movable member about its position of equilibrium.

References Cited in the file of this patent

UNITED STATES PATENTS

| | | |
|---|---|---|
| 1,484,358 | Norton | Feb. 19, 1924 |
| 1,851,703 | Hamilton | Mar. 29, 1932 |
| 2,032,016 | Hitner | Feb. 25, 1936 |
| 2,163,404 | Mead, Jr. | June 20, 1939 |
| 2,222,140 | Iongh | Mar. 19, 1940 |
| 2,263,055 | Smith, Jr. | Nov. 18, 1941 |
| 2,397,038 | Obenshain | Mar. 19, 1946 |
| 2,465,891 | Lindars | Nov. 29, 1949 |
| 2,633,349 | Williams | Mar. 31, 1953 |

FOREIGN PATENTS

| | | |
|---|---|---|
| 760,343 | France | Feb. 20, 1934 |

OTHER REFERENCES

Ser. No. 386,957, Popov (A. P. C.), published May 25, 1943.